June 20, 1967 W. C. MILLIGAN 3,326,263
APPARATUS FOR COMBUSTION OF FUEL-AIR MIXTURES
Filed Oct. 15, 1964 4 Sheets-Sheet 1

INVENTOR.
William C. Milligan

June 20, 1967 W. C. MILLIGAN 3,326,263
APPARATUS FOR COMBUSTION OF FUEL-AIR MIXTURES
Filed Oct. 15, 1964

INVENTOR.
William C. Milligan

ATTORNEYS

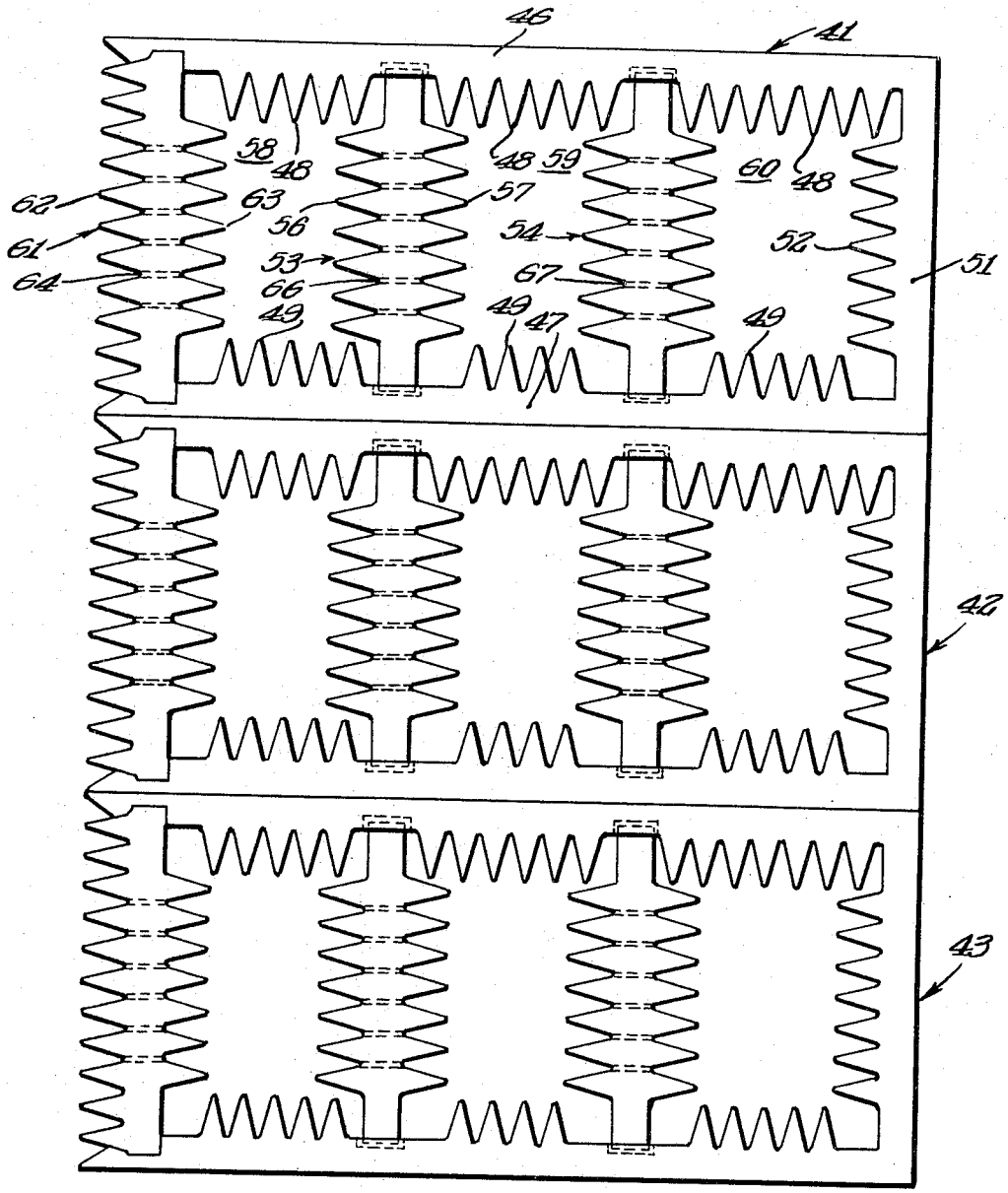

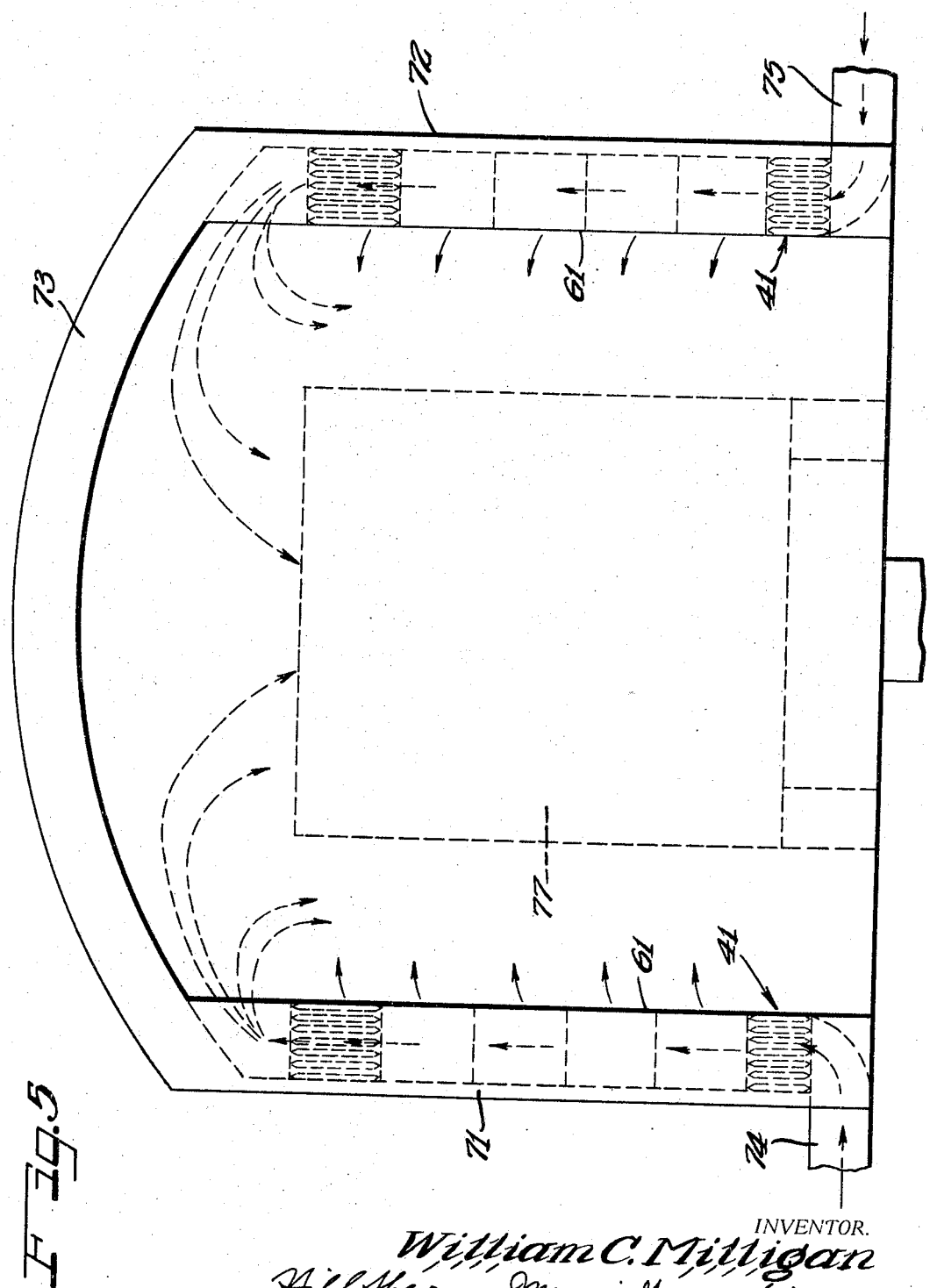

United States Patent Office 3,326,263
Patented June 20, 1967

3,326,263
APPARATUS FOR COMBUSTION OF FUEL-AIR
MIXTURES
William C. Milligan, 1618 San Angelo Blvd.,
San Antonio, Tex. 78201
Filed Oct. 15, 1964, Ser. No. 404,147
13 Claims. (Cl. 158—7)

This is a continuation-in-part of application Ser. No. 127,419, filed June 6, 1961, and now abandoned.

The present invention relates to improvements in methods and apparatus for the combustion of fuel-air mixtures.

Any heating system for use in the home or industry must necessarily be quick heating, highly efficient, highly productive of infrared radiation and hot gases, simple, rugged, safe, and inexpensive to use and to manufacture. The heating system most commonly in use today, of course, involves the flame combustion process which has been developed, within its inherent limitations, to a high degree of efficiency and reliability. Nevertheless, the use of gases or liquid fuels in a flame combustion process involves several hazards among them being explosion hazards, and carbon monoxide poisoning. In addition, incomplete combustion of the fuel represents a definite loss.

The present invention is directed to methods and apparatus involving catalytic reactions of a high order, high temperature, and high degree of efficiency. One of the objects of the invention is to provide a means for obtaining efficient exothermic catalytic reactions from a wide range of low cost materials.

Another object of the invention is to provide a means for obtaining very high catalytic activity rates which increase in proportion to increases in temperature.

Another object of the invention is to provide a means for obtaining flame and catalytic combustion temperatures in excess of those obtainable for a given type of fuel-air mixture of varying ratios in the best types of conventional apparatus.

Another object of the invention is to provide a new means for continuously activating low cost catalytic materials into extraordinarily effective catalysts by means of infrared radiation.

Another object of the invention is to provide a means for obtaining efficient exothermic reactions from both flame and catalytic reactions in higher temperature ranges, and flameless catalytic reactions in lower temperature ranges.

Another object of the invention is to provide a simple, low cost means for fabricating catalysts of inexpensive materials, which compare favorably and even exceed the activity rates of the most expensive catalysts.

In the past, infrared radiation losses in flames have caused substantial reductions in peak temperatures and a corresponding loss in efficiency. The prevention of substantial losses of radiation forms an important feature of this invention, by raising flame temperatures and improving upon catalytic activity.

The radiation from any system in complete equilibrium will be continuous and the same for a black body at the same temperature as the system. Fully aerated flames usually evidence an emission spectrum of discrete bands, while even luminuos flames of fuel-rich mixtures normally have a much lower emissivity than unity, that is, they radiate less than a black body.

In small flames, the emission of radiation by molecules and particles is not balanced by the absorption of radiation, so that there is a steady deactivation of excited molecules and radiation cooling of particles which has to be made up by collision processes within the flame gases. If these collision processes are not sufficiently efficient, then the distribution of energy among excited molecules or the temperature of solid particles may differ from that for equilibrium at the temperature of the flame gases.

Theoretical flame temperatures are only attained if there is no heat loss by radiation, thermal conduction or diffusion to the walls. The maximum temperature is therefore only reached in the centers of rather large premixed flames in the region just above the inner cone. In some systems, the radiation losses are so great that the temperature of the flame is only about ½ of what it should be theoretically.

If there are a number of objects enclosed within a chamber in which there is a radiating body, and the objects are opaque, part of the radiant energy impinging upon any given surface area is absorbed and the remainder is reflected. The reflected energy augments the radiant energy that is then being emitted from that area of the body surface. The rates of emission and absorption being equal to each other for each unit area of surface when equilibrium exists, the rate of reflection plus emission equals the rate of reflection plus absorption. The latter sum is the rate at which the radiant energy impinges upon every unit area of surface within the chamber. Thus, for opaque objects at a given temperature surrounded by opaque walls at the same temperature, each unit area of surface radiates and reflects, together, at the same total rate as does every other unit area of surface within the enclosure, regardless of whether, for any given unit area, the emission rate is high and the reflection is low, or vice versa.

When radiant energy impinges upon a surface, the fraction reflected at the point of incidence depends upon both the substance of the body and its surface condition. As a rule, an optically smooth surface is more highly reflective than a rough surface. The roughness tends to entrap the radiant energy and direct it into the body. The radiant energy that enters the body is absorbed along its path of travel to an extent dependent upon the absorption characteristics of the substance and the length of the path traversed within the body.

The present invention involves a method and apparatus for utilizing the infrared radiation more effectively to the end that temperatures more nearly approaching the theoretical flame temperature are obtainable in the system. To do so, I make use of improved catalytic materials to improve the combustion characteristics of the fuel-air mixtures.

The present invention is characterized by the use of improved catalytic materials which are inexpensive, as compared to the noble metal and other combustion promoting catalysts of the prior art. In the present invention, I make use of commonly available ceramic materials such as various types of clay, alumina, and zirconia which ordinarily have relatively low activity rates. The new catalysts are characterized by extremely high activity rates over wide temperature ranges, and by the attainment of temperatures with specific fuel-air ratios far in excess of temperatures attainable by other flame combustion systems. The efficiency of the new materials is sufficiently high so that if the device is used under optimum operating conditions, it will get so hot that it will melt unless sufficient excess air is provided to prevent excessive heat buildup. Furthermore, tests indicate that the majority of the materials used in accordance with the invention are apparently immune from poisoning effects which have created so much difficulty in prior catalysts.

With the new system of the present invention, at the outset of combustion, the temperature changes appear to progress in discrete energy surges. When the fuel-air mixture is introduced at a steady rate, it has been observed that the heat output as determined by the progressive changes in radiant energy output will progress in a pulsating fashion. In other words, the heat energy as exhibited by the changes in light will surge quickly to a higher plateau, remain there for a few seconds time, and then surge suddenly to another higher plateau, until a peak temperature is attained and stabilized. At this peak temperature, no sudden energy changes are observed. Although the reasons for this type of action are not all known, it appears that these progressive changes in temperature are probably due to the multiplying effects of the infrared radiation which in turn increases the catalytic activity rate of the catalytic materials. The increase in activity rate then promotes the ionic and catalytic dissociation and recombination of the reactant materials at higher rates of speed while constantly diffusing into and out of the catalytic surfaces. These substantial increases in temperature also increase the vibrational frequency of both the reactant molecules and the catalytic molecules, to emit radiant energy at a higher frequency. The higher frequency rates also mean higher energy rates. As the energy rates go up, so does the catalytic activity in proportion, and this is combined with a proportional increase in radiation density. Thus, in the heater of the present invention, the radiant energy activates and promotes the catalytic surfaces into high energy catalytic reactions in proportion to the electromagnetic radiation frequency and density per square inch.

The radiation intensity increases with temperatures at any particular wavelength. In accordance with the present invention, it is important to concentrate as much as possible of the energy available to the system in the peak of the radiation curve. The peak temperature point is easily controlled in this invention by the use of a reaction diluent such as excess air, inert gas, or a reducing gas. The use of excess air as a temperature control medium has the advantage that a larger proportion of hot gases, at a certain optimum temperature, can be achieved. In using highly porous materials, this peak range extends from a wavelength of 3.16 microns down to less than 1 micron; in using noble metals, the corresponding wavelength is about 3.16 to 10 microns.

In the process of the present invention, I can make use of oxides and other refractory catalysts under conditions in which they have substantially improved catalytic activity. For example, nickel oxide and chromium oxide can be included in a number of formulas, and these oxides provide a metallic radiation emissivity surface equal to the best high temperature metals for radiation, such as the alloy "Inconel," consisting of 80% nickel and 20% chromium. This provides a large and effective surface area for efficient emission and absorption of radiation, which can withstand far higher temperatures without decomposing than possible with the metal itself. The oxides can be used in widely varying ratios to produce the desired result. The particles are sintered and bonded together during the firing process throughout the structure of the material. In spite of their highly oxidized state, these metal oxides are converted into very effective catalysts by the radiant energy present during operation of the device.

Furthermore, these oxides are also very effective infrared radiators with a high emissivity rating.

Various other metallic compounds can be used within the scope of the present invention, providing that their inclusion does not cause an adverse effect on the overall composition, such as reducing its effective temperature range by lowering its fusion point. Consequently, the first criterion for selecting a suitable catalyst is its ability to withstand the peak temperatures involved without any adverse effects upon the materials with which which it may be mixed.

In order to obtain full advantage of the invention with respect to high catalytic activity rates, it is also important that the ceramic formula used be fabricated into an extremely porous mass. The larger the pore volume area for catalytic action with reacting gases, the more efficient the structure becomes as a catalyst. The large pore volume area of the ceramic material can be obtained by the inclusion of burnout materials such as powdered wood, coal, or the like, or, preferably, by a foaming process. In any event, the porosity should be sufficiently high so that the gas contact area of the catalyst should be in the range from about 100 to 1000 square meters per gram. Actually, there is no limit to the amount of porosity which can be effectively employed, other than the structure should have a minimum strength at the peak temperatures used.

The existence of the high pore volume provides a very high pore volume reactant area, assisting in the rapid diffusion of reactant gases in and out of the catalytic structure. In addition, the substantial number of pores at the surface also greatly assists in the absorption and re-emission of infrared radiation. The addition of metallic elements to the formula such as nickel, chromium, and the like also aids the emission of electrons by increasing the electrical conductivity of the catalytic structure at high temperatures. In addition these metals can also be used to increase the thermal conductivity of the highly porous material to obtain equilibrium temperatures quickly inside the heating elements.

After the catalytic ceramic material has been formed, pressed, or cast into the desired size and shape and then fired, it will be found that the surfaces have a thin, relatively non-porous ceramic skin on the outside of the catalytic structure. It is important that this skin surface be completely removed by grinding, sandblasting or other means as otherwise the high pore volume required will be correspondingly reduced or eliminated.

One of the lower cost types of catalytic material available for this use is the clays commonly used in the ceramic art. Such clays, however, should have a minimum of iron, borax, potassium or other fluxing agents which tend to lower the peak refractory operating temperature. Therefore, it is preferable to use the better grades of kaolin clays of the type known as china clays.

The performance of such clays can further be improved, as stated previously, by the addition of metallic elements such as nickel and chromium. In addition, it has been found that calcium oxide when added improves the catalytic activity rate. The percentage of calcium oxide can vary from less than 1% to 25% or more for most applications, and generally 5 to 15% by weight is preferred. The calcium oxide can be formed in situ by adding calcium carbonate to the formula, which compound decomposes under the high temperatures involved to leave numerous tiny voids within the catalytic structure.

The formula is further improved by the addition of a small quantity of nickel and chromium oxides. The addition of these materials serves to help increase the catalytic activity, to increase the efficiency and density of electromagnetic radiation, and increases the electron emissivity available at the temperatures involved.

Instead of the various clays mentioned, alumina itself can be used as the primary ingredient of the catalytic composition, and can also be mixed with nickel and chromium oxides to obtain advantages outlined in connection with the clay types. Since the better grades of alumina are also very white and would therefore have undesirable reflection characteristics in respect to peak efficiency, the inclusion of the chromium and nickel oxides effectively counteracts the high reflectance factor. It also provides a mixture of three effective catalysts which are compatible with each other at temperatures in excess of 3000° F.

For temperatures in excess of 4000° F., zirconia has very desirable properties as the basic ingredient. When zirconia is stabilized with a small amount of calcium oxide, its expansion and contraction properties are improved and rendered almost linear. In order to improve the black body absorption characteristics of this material, metal oxides such as tungsten oxide, molybdenum oxide, rhenium oxide, and the like can be mixed with the zirconia in small quantities to improve the catalytic activity rate, radiation absorption, and electron emission characteristics.

The following example sets forth a suitable method for preparation of the catalytic material, and is submitted as being illustrative only.

A first formula was made up with the following ingredients:

Table I

| | Ml. |
|---|---|
| China clay | 1300 |
| Relatively iron free ball clay | 100 |
| Calcium carbonate | 100 |
| Nickel oxide and chromium oxide, in a volumetric ratio of 1:1 | 10 |
| Combustible carbonaceous particles which pass a 50 mesh sieve but are retained on a 100 mesh sieve | 1400 |

These powdered materials are thoroughly mixed in the dry state and then sufficient water is added to make a slurry thin enough to pour into a casting pan but not thin enough to cause excessive shrinkage or to allow heavier particles to settle to the bottom of the casting vessel. The slurry is then dried at a rate which will not cause severe cracking or rupture. The material is then fired in a kiln at a suitable temperature range such as cone 3 or 4. After firing and removal from the kiln, the material is crushed to provide a maximum quantity of granular material which will pass through a standard size 14 sieve but not through a standard size 15 sieve.

Next, the following formula is made up:

Table II

| | Ml. |
|---|---|
| Granular material produced from the composition of Table I | 900 |
| Powdered material produced from the composition of Table I but which passes through a No. 50 sieve | 100 |
| China clay | 300 |
| Low iron ball clay | 100 |
| Calcium carbonate | 100 |
| 1:1 nickel oxide-chromium oxide mixture | 100 |
| Burnout material as in Table I | 200–400 |

The dry ingredients were mixed and then water was added. After pressing to size and shape, the green material is carefully dried and placed in a firing kiln to be fired at the same cone number as before, or higher, depending on the surface temperatures later desired. In some instances, it is desirable to fire the second time at a higher temperature because intergranular sintering will also occur between the grains in addition to the binding effect of the raw clay.

As noted previously, burnout material is added to the mixture of Table II, but in a much smaller ratio than employed in the composition of Table I. Generally, anywhere from 20% to 40% of burnout material will suffice in the second formula. The burnout material used the second time in the fabrication process is to prevent excessive compacting of the mass and particularly to prevent the ball and china clays from agglomerating and reducing the porosity. The burnout material should provide only a thin, even distributed binding film between the grains of material.

If the formula of Table II is to be used for press operations under considerable hydraulic pressure, and has to retain a certain green strength until firing, then only sufficient water should be added to allow a stiff, usable paste to be formed. Usually about 10% to 15% water be adequate.

The composition of Table II has excellent heat-shock characteristics and particularly low thermal conductivity. For example, an air-acetylene flame adjusted to about 4000° F. can be suddenly applied to the surface of this material without causing it to crack or have any other adverse effect. The material also heats up very rapidly under the flame and becomes highly incandescent in a very short period of time.

The high temperature materials previously mentioned, such as alumina and zirconia, can be used as the primary materials in the formulas. These materials can also be processed with the same general techniques of high porosity formation, firing, crushing, remixing and firing again. The crushed granular material should be used in substantially the same proportions as in the clay formulas.

The outer surfaces of any ceramic materials fabricated as described herein should be lightly ground after firing to remove any ceramic skin material which may cover the pores.

A further description of the present invention will be made in conjunction with the attached sheets of drawings which illustrate several embodiments.

In the drawings:

FIGURE 3 is a plan view of another form of the invention;

FIGURE 4 is a somewhat schematic view of an installation particularly useful for boiler heater installations and the like; and FIGURE 5 illustrates, in elevation, still another modified form of the invention.

As shown in the drawings:

Figure 1:
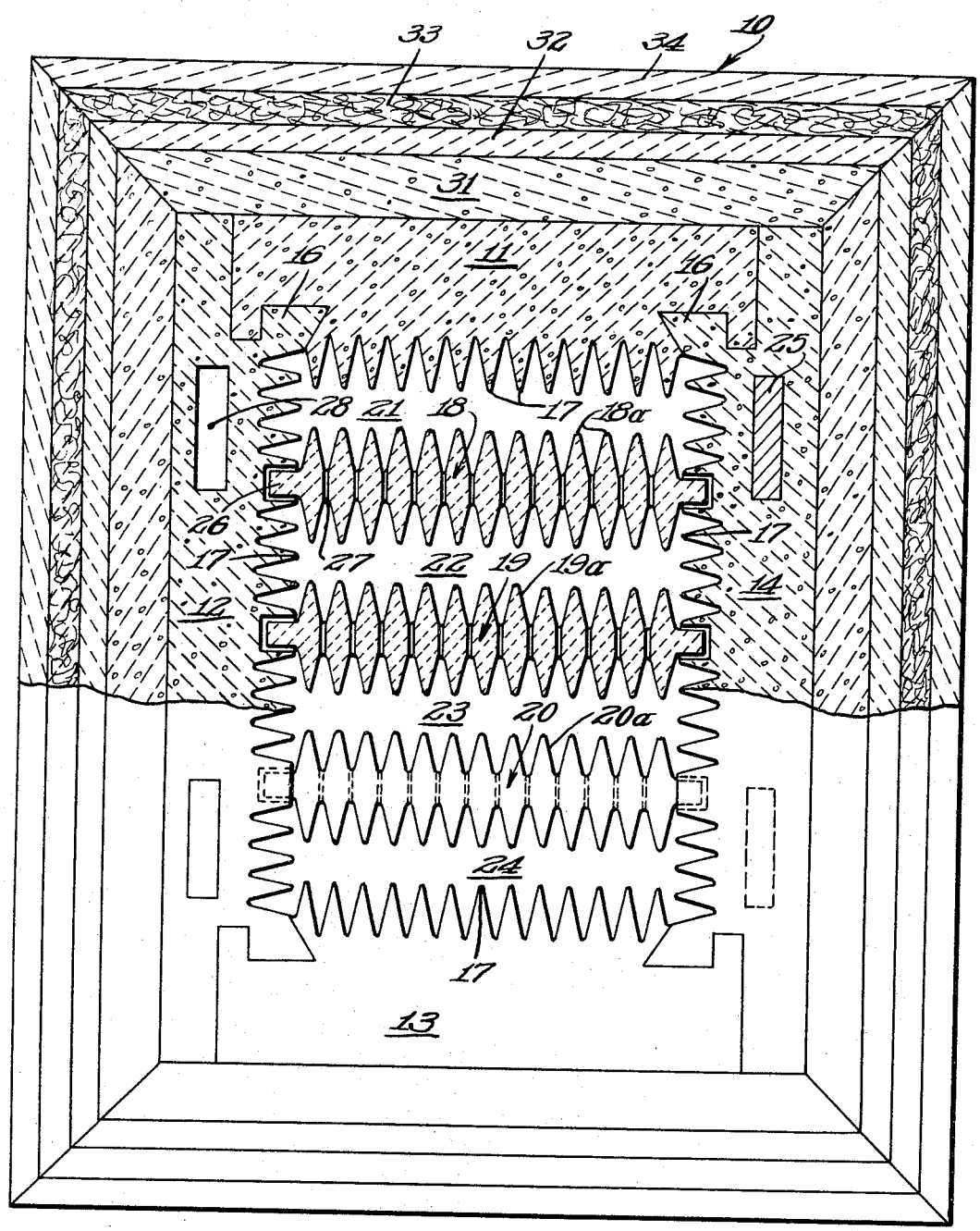
FIGURE 1 is a view partly in elevation and partly in cross-section illustrating a device intended for the production of hot gases.

In FIGURE 1, reference numeral 10 indicates generally a heater particularly arranged for the production of hot gases. The interior walls of the heater, 11, 12, 13 and 14 are interlocked by means of dovetails as indicated at reference numeral 16. The inner faces of the walls 11 through 14 are provided with triangularly shaped projections 17 to increase the total radiating area and to increase the total area available for catalytic reactions.

Extending between the walls 12 and 14 are a plurality of catalytic inserts, 18, 19 and 20 also having non-planar, undulating surfaces 18a, 19a and 20a respectively providing for extended reflection of infrared radiation therebetween. The inserts 18 through 20 also serve to define channels 21, 22, 23 and 24 for the passage of combustion gases through the heater.

The ends of the inserts 18, 19 and 20 may be provided with tabs 26 to fit loosely into suitable notches provided in the opposed walls 12 and 14, thereby providing for thermal expansion. The walls 12 and 14 may have an alternate series of tabs 25 and slots 28 to permit stacking a plurality of units in vertical engagement to build up as many as necessary.

Figure 2:
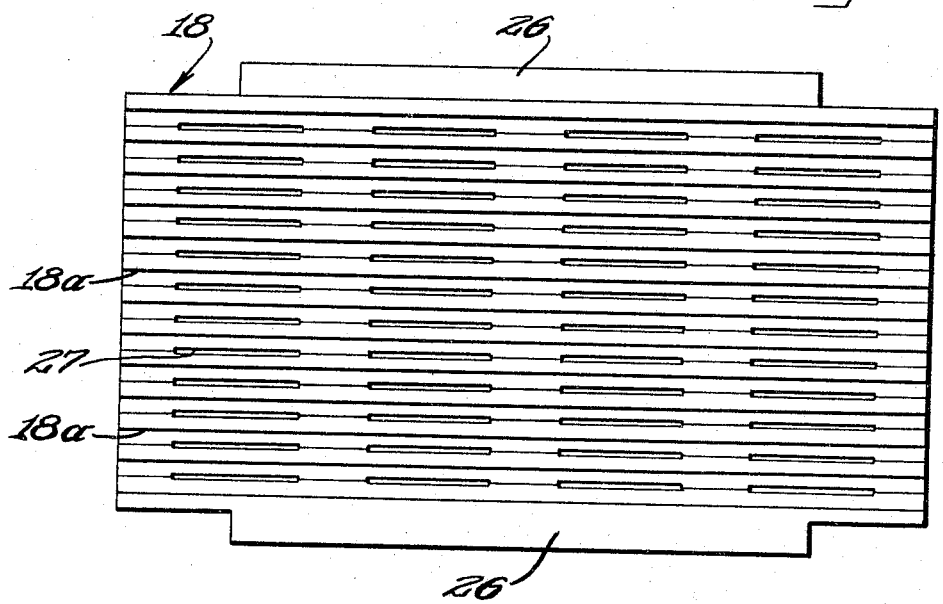
FIGURE 2 is a plan view of one of the catalytic units illustrated in FIGURE 1.

Each of the inserts 18, 19 and 20 is also provided with slots 27 between the projections 18a, as best illustrated in FIGURE 2 of the drawings. The slots 27 allow for circulation of gases back and forth through the various chambers and thus provide rather tortuous paths for the circulation of combustion gases through the heater.

The remainder of the heater assembly shown in FIGURE 1 includes a porous insulating wall 31 consisting of a material with at least as high a porosity and as low a thermal conductivity as the material constituting the walls 11, 12, 13 and 14. The material constituting the wall 31 should be as white as possible in order to minimize the absorption of radiation from the walls 11 through 14. The material of the wall 31 must be very porous and have a low thermal conductivity in order to minimize the existence of thermal gradients.

Absorption losses are further reduced by surrounding the wall 31 with a non-porous insulation 32, which may be composed of thin sections of zirconia or magnesia bricks or slabs which are also as nearly white as possible.

The non-porous zirconia or magnesium oxide are relatively poor thermal conductors and much less efficient for the transfer of radiation through the mass than a highly porous type.

The non-porous insulation 32 is backed up by a wall 33 composed of ceramic batting or wool-like materials. This material should, also, be as white as possible. The ceramic batting has very poor radiation transfer properties and very good infrared reflection properties. Therefoore, any residual radiation extending as far as the inner surface of the ceramic wall 33 will be re-radiated back toward the source of radiation. Another important function of the wall 33 is to provide a resilient cushion for any expansion or contraction cycles encountered during service. It also provides a very simple and effective means of reducing gas leakage from the interior of the heater.

Surrounding the ceramic wall 33 is an outside layer of highly porous low thermal conductivity insulation 34 which holds a ceramic insulating material in place and helps provide a tight seal. The outer wall of the insulation 34 may be at a very low temperature, so that further sealing may be provided in a simple and inexpensive manner to insure that no gas leakage occurs under high pressure operation.

The various layers of insulation about the heater can be of any desired thickness to obtain the best results at a minimum cost. For example, there are presently available ceramic wools or batting made from kaolin clay under the trade name "Kaowool" which are available for continuous operation at 2300° F. Another white type is available under the trade name "Fiberfrax" made of aluminum oxide, and is suitable for temperatures up to 3000° F. Another type, soon to be marketed, has a melting point of approximately 4500° F. and is made from zirconia.

When a flame is permitted to exist along the passageways 21, 22, 23 and 24, the combustion flames passing parallel to the walls 11, 12, 13 and 14 and to the inserts 18, 19 and 20 serve to bring the walls and inserts rapidly up to the preliminary point of initiating catalytic activity. The initial catalytic action of any significance for most inexpensive clay type materials will begin with relatively low rates at about 1200 to 1300° F. As the temperature rises, the catalytic activity rate increases in proportion and in rate. Since all of the surfaces contacted by the flame are highly porous and capable of high catalytic activity at elevated temperatures, the increase in temperatures is quite rapid, because the higher the temperature, the higher the radiation density and, in turn, the higher the catalytic activity rate. The majority of the catalytic reactions occur at the surface and for a few thousandths of an inch inside the various surfaces of the catalytic material. Since the catalytic reaction occurs primarily in direct contact with the reactant gases, the resulting temperature increase liberates heat at and inside the catalytic surfaces where it can be most effectively absorbed with virtually no loss and, in part, re-emitted as radiation. Since this exothermic reaction is occurring directly in the substantial pore volume area provided at the surface and inside the surface for a fraction of an inch, the catalytic structure is then heated by the exothermic reaction with a high degree of efficiency.

In addition to the efficient production of hot gases by large surface area catalytic reactions, the total heat content is further increased by the absorption and re-emission of radiation a number of times before a certain amount of the radiation escapes. The rough, porous, triangular surfaces efficiency absorb and then re-emit radiation with a minimum amount of reflection being involved.

In the operation of the device of the present invention, it is advisable to use larger amounts of air than ordinarily would be used in heaters of this type. Typically, I prefer to use an air to fuel ratio of 20 to 1 or so, whereas most heaters operate with an air to fuel ratio of 10 to 15 to 1. This excess air is used as the control agent for absorbing the excess heat which might otherwise damage the catalytic materials.

The arrangement shown in FIGURE 3 is in many respects similar to the assembly of FIGURE 1. It includes a plurality of side-by-side units 41, 42 and 43, each of the units being of substantially identical configuration. Each unit has opposed side walls 46 and 47 provided with non-planar, generally triangular projections 48 and 49 in confronting relation. An end wall 51 is likewise provided with inwardly facing projections 52. Received between the opposed side walls 46 and 47 are a pair of catalytic inserts 53 and 54 having triangular projections 56 and 57 respectively on both sides thereof. The arrangement of the walls and the inserts provide a plurality of passages 58, 59 and 60 in each unit 41 and similarly, in units 42 and 43. It should be understood that any number of units can be stacked vertically with the projections in alignment so that the height of the passages 58, 59 and 60 can be adjusted as desired.

The front of the unit 41 is provided with a face plate 61 having outwardly directed projections 62 and inwardly directed projections 63 thereon. Provision is made for discharging hot gases through the face plate 61 by means of slots 64 which exist between the projections 62 and the projections 63. Similarly, slots 66 and 67 are provided in the inserts 53 and 54 to permit intercommunication of the hot gases between the passages 58, 59 and 60. This arrangement is quite efficient, and requires relatively low volumes of fuel-air mixtures to maintain a high degree of incandescence of the face plate 61.

Figure 4:
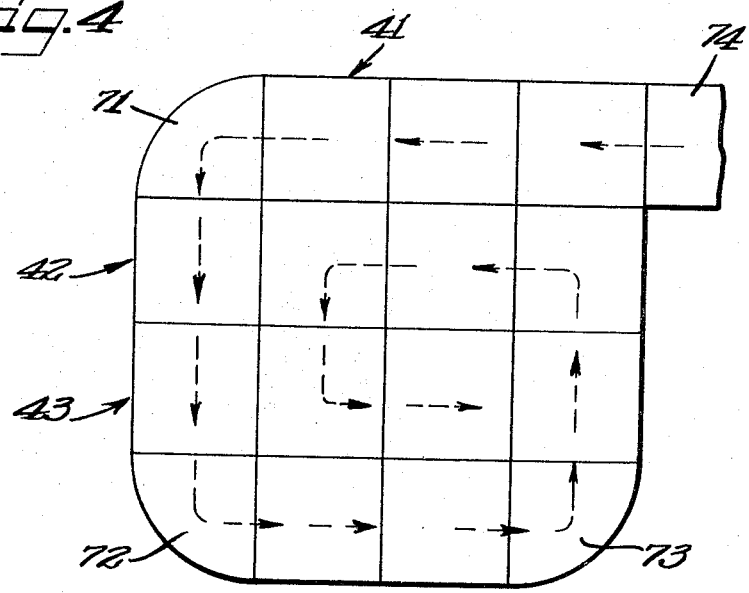

FIGURE 4 illustrates the manner in which units of the type shown in FIGURE 3 can be placed in series in a rectangular or a circular configuration. In the arrangement shown, each outside corner is provided with an arcuate deflector means 71, 72 and 73. The fuel-air mixture is introduced through an inlet port 74 and follows the direction indicated by the arrows, to be exited centrally of the unit. Each of the units may, if desired, be faced with a face plate such as face plate 61 shown in FIGURE 3 to provide for the venting of hot gases as well as the infrared radiation. The unit shown in FIGURE 4 can be supported horizontally with steam coils or other work load placed above it, with the hot rising gases circulating freely through the steam coils, and the radiation from the face plates also being directed in the same direction.

The arrangement shown in FIGURE 5 of the drawings illustrates the manner in which the units of FIGURE 3 can be combined to provide a furnace type structure. The furnace itself has side walls 71 and 72 and an arched roof 73. Fuel-air mixtures are introduced into the furnace through inlet ports 74 and 75 located at the base thereof. A plurality of the catalytic units 41 as shown in FIGURE 3 is arranged in vertical relation, with the face plates 61 facing inwardly, as shown. As indicated by the arrows in FIGURE 4, a proportion of the gases in the catalytic units will be vented inwardly through the slots of the face plate 61 and be directed at a work load generally identified at numeral 77 in the drawings. The remainder of the gases are vented out through the top of the stacked units, as indicated by the arrows. The radiation from the face plate 61 is applied to the work load, as well as the hot gases passing through the radiant faces. These faces absorb and re-radiate energy effectively from the extended areas thereof. If desired, the pair of wall areas and the ceiling 73 can be completely composed of the radiating units so that more rapid heat-up rates could be obtained.

While the foregoing description has dealt with specific embodiments of the invention illustrated in the drawings, it should be realized that numerous modifications can be made to the described embodiments without departing from the scope of the present invention.

I claim as my invention:

1. A catalytic heater unit comprising a housing, means for introducing fuel and a combustion promoting gas into said housing for combustion therein, and a plurality of infrared radiating, combustion promoting catalytic surfaces in confronting relation defining channels for the passage of combustion gases through said housing, the entire periphery of said channels being non-planar, undulating surfaces providing for extending reflection of infrared radiation therebetween, some of said surfaces having openings therein communicating said channels to adjoining channels.

2. A catalytic heater unit comprising a housing, means for introducing fuel and a combustion promoting gas into said housing for combustion therein, and a plurality of infrared radiating, combustion promoting catalytic surfaces in confronting relation defining channels for the passage of combustion gases through said housing, the entire periphery of said channels being a series of generally triangular peaks providing for extended reflection of infrared radiation therebetween, some of said surfaces having openings therein communicating said channels to said adjoining channels.

3. A catalytic heater unit comprising a housing, means for introducing fuel and a combustion promoting gas into said housing for combustion therein, and a plurality of infrared radiating, combustion promoting catalytic surfaces in confronting relation defining channels for the passage of combustion gases through said housing, the entire periphery of said channels being non-planar, undulating surfaces providing for extended reflection of infrared radiation therebetween, said surfaces being uniformly porous and having a gas contacting area of from 100 to 1000 square meters per gram, some of said surfaces having openings therein communicating said channels to adjoining channels.

4. The heater unit of claim 1 in which said catalytic surfaces are composed of a porous clay.

5. The heater unit of claim 1 in which said catalytic surfaces are composed of a porous clay having at least one combustion promoting oxide therein.

6. The heater unit of claim 1 in which said catalytic surfaces are composed of a porous clay having both nickel oxide and chromium oxide distributed therein.

7. A catalytic heater unit comprising a housing, means for introducing a fuel and a combustion promoting gas into said housing for combustion therein, and a plurality of infrared radiating, combustion promoting catalytic inserts supported within said housing to provide with the walls of said housing a plurality of passages for the passage of combustion gases therethrough, said inserts and said walls having non-planar, undulating projections thereon and said inserts having a plurality of apertures therein between said projections permitting the flow of gases between said passages.

8. The heater of claim 7 in which at least one of the outer walls of said housing is provided with outwardly directed infrared rdiating projections and apertures therebetween to permit outward radiation and gas passages therethrough.

9. The heater of claim 1 in which said surfaces being a series of generally triangular peaks provide for extended absorption and emission of infrared radiation therebetween.

10. The heater of claim 1 in which said catalytic surfaces are composed of a porous refractory material.

11. The heater of claim 1 in which said catalytic surfaces are composed of a porous refractory material having at least one combustion promoting oxide having high radiation emissivity characteristics.

12. The heater in claim 1 in which the radiant energy activates and promotes the catalytic activity rates of highly porous refractory material in the peak electromagnetic frequency range from 3.16 microns to less than 1 micron.

13. The heater in claim 1 in which the radiant energy activates and promotes the catalytic activity rates of highly porous refractory materials in the peak electromagnetic radiation frequency range of from 10 microns to 3.16 microns.

References Cited

UNITED STATES PATENTS

| | | | |
|---|---|---|---|
| 1,486,036 | 3/1924 | Risinger | 126—92 |
| 1,683,375 | 9/1928 | Wiederhold | 126—92 |
| 2,221,583 | 11/1940 | Hoop | 23—288.9 |

FREDERICK L. MATTESON, JR., *Primary Examiner.*

E. G. FAVORS, *Assistant Examiner.*